Sept. 10, 1946.  J. BANNEYER  2,407,217
CONDUIT SUPPORTING DEVICE
Filed May 8, 1944  2 Sheets-Sheet 1

Inventor:
Joseph Banneyer,
By Dawson, Ooms & Booth,
Attorneys.

Sept. 10, 1946.　　　J. BANNEYER　　　2,407,217

CONDUIT SUPPORTING DEVICE

Filed May 8, 1944　　　2 Sheets-Sheet 2

Inventor:
Joseph Banneyer,
By Dawson, Ooms & Booth
Attorneys.

Patented Sept. 10, 1946

2,407,217

UNITED STATES PATENT OFFICE 2,407,217

CONDUIT SUPPORTING DEVICE

Joseph Banneyer, Chicago, Ill.

Application May 8, 1944, Serial No. 534,581

11 Claims. (Cl. 248—68)

This invention relates to a conduit supporting device, and more specifically to such a device adapted to support a plurality of conduits in various positions and arrangements.

An object of the invention is to provide a device adapted to firmly and securely support a plurality of conduits or cables and which can be readily assembled and dismantled. A further object is to provide such a device having a minimum number of dissimilar parts and which is simple of construction.

A more specific object is to provide a cable supporting device employing a series of conduit engaging members which can be connected together or taken apart as desired, the one being threadedly secured to the other, so that any desired number of conduits can be handled. Another object is to provide such a supporting device suitable for supporting any number of conduits of the same or different sizes and extending in the same or different directions, and which may be adapted for attachment, either to side walls or to top walls or ceilings.

Further objects of the invention will be apparent as the specification proceeds.

One embodiment of the invention is illustrated by the accompanying drawings, in which—

Figure 1:
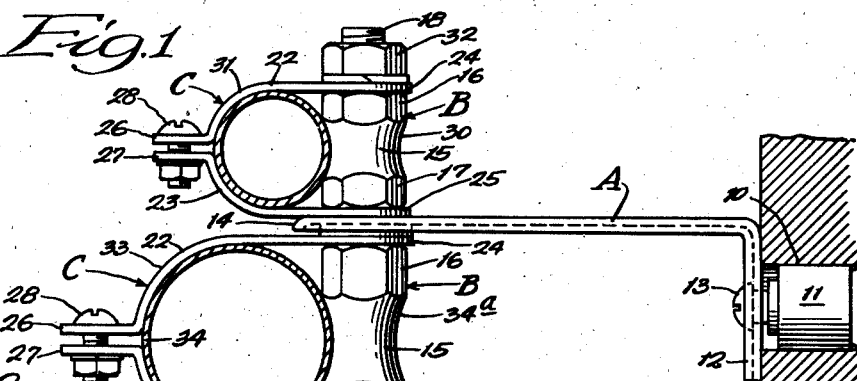
Figure 2:
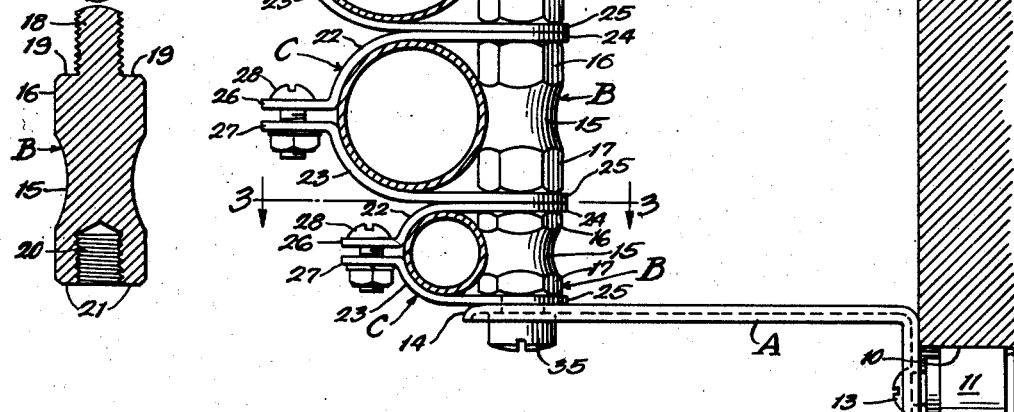
Figure 3:
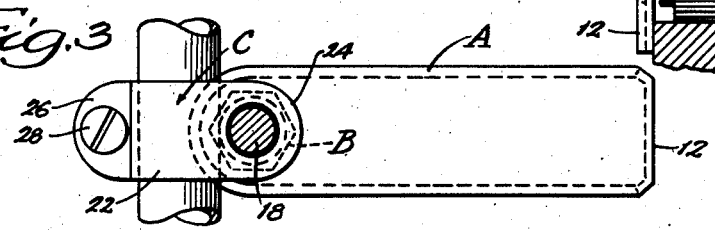
Figure 4:
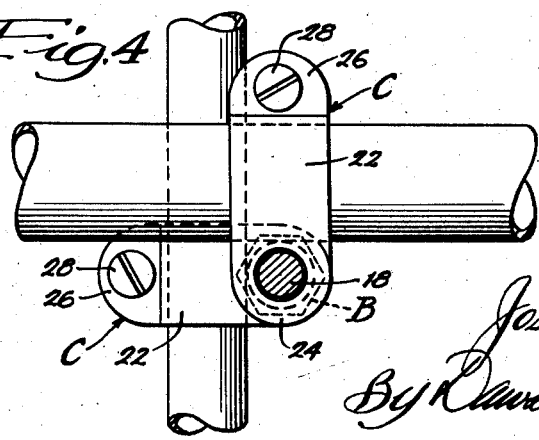
Figure 5:
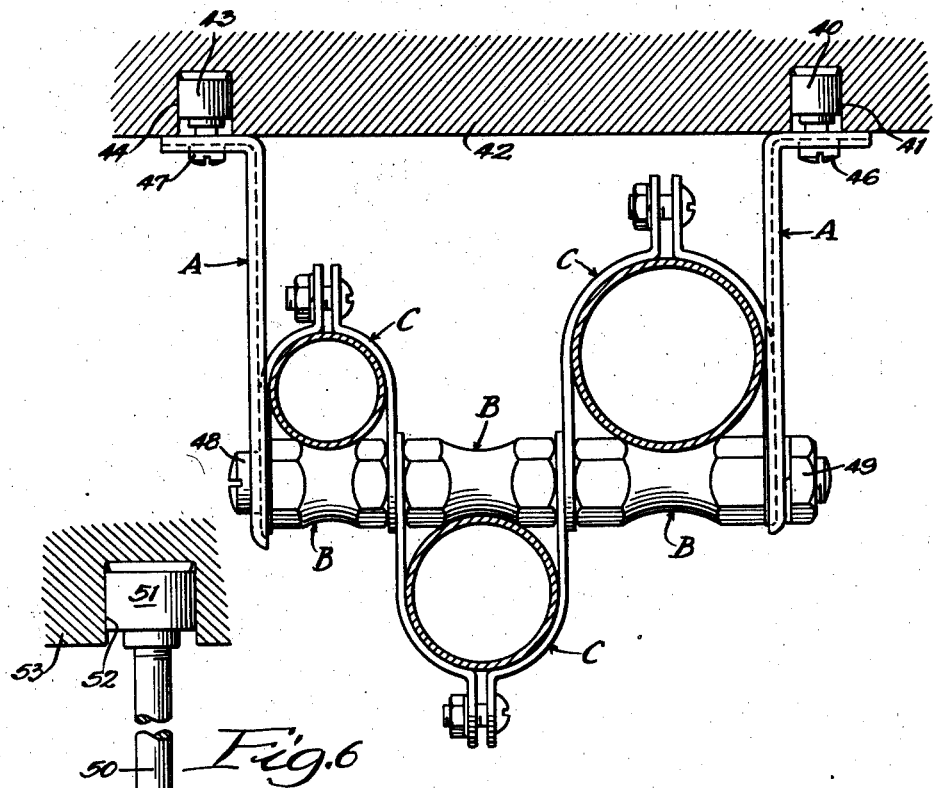
Figure 6:
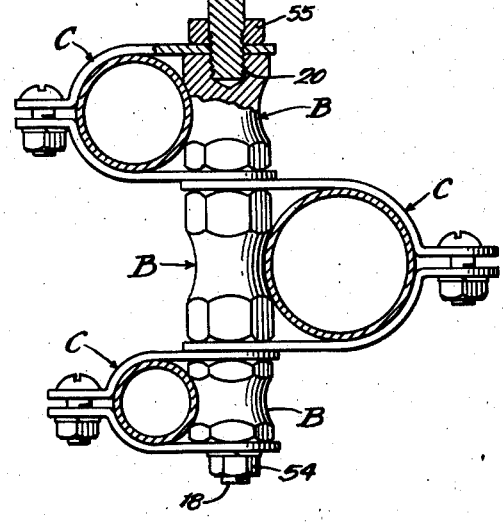

Fig. 1 is an elevational view of the improved device arranged for attachment to a side wall structure and for supporting a number of conduits disposed one above the other in parallel relation; Fig. 2 is a detail cross sectional view of one of the conduit engaging members; Fig. 3 is a plan view of the device as illustrated in Fig. 1; Fig. 4 is a plan view of the device as arranged to support cables at substantially right angles with each other; Fig. 5 is an elevational view of the device similar to that shown in Fig. 1 but arranged to support a number of cables extending in staggered relation, the device being attached to a ceiling or top wall; and Fig. 6 is an elevational view showing a modified arrangement for mounting the improved structure to a ceiling or top wall and showing the device in position to support a number of conduits in vertical staggered relation, alternate conduits being supported on different sides of the conduit engaging members of the supporting device.

As illustrated in Figs. 1 to 5, the improved device includes a pair of brackets A, one or more of the conduit engaging members B, and one or more of the clamping members C.

The brackets A may be of any suitable form and construction. Referring particularly to Fig. 1 of the drawings, the brackets A may be attached to a concrete wall or other such side wall structure. One means of making this attachment is to provide the openings 10 and place in these openings the expansible device 11, then place the base 12 of the brackets over the openings and secure them fast by turning in the screws 13. The brackets A may be identical and have their outwardly-extending arm portions 14 spaced by a distance equal to the length of one or more of the conduit engaging members B. Each of the arms 14 is provided near its end with an opening through which the threaded extension of a conduit engaging member may be inserted.

The conduit engaging members B may be of the same or different lengths as is desired to accommodate small or large conduits. Each of them has a central portion 15 which is uniformly curved in concave fashion so that irrespective of how the member is turned about its axis the same surface will be presented for contact with a conduit. Another way of describing this central portion 15 is to say that its transverse cross section is smaller at its center, is circular in form, and increases in size both above and below the vertical center.

At each end of the members B is a portion which is polygonal in cross section like a nut and is adapted to be engaged by a wrench or other such tool for turning the member to tighten it. The top end portion 16 of each member B has equal sides and angles and is the same size as the bottom end portion 17, so that each of these ends may be engaged by the same size wrench.

At one end of each of the members B is a threaded extension 18 which is smaller than the end portion 16 so that the member has the shoulders 19 at its one end. At the other end of each of these members is a tapped opening 20, and beside the mouth of this opening are the shoulders 21. The tapped openings 20 of each of the members is of a size and thread to receive the threaded extension of another of the members, and preferably the threaded extensions and tapped openings of all the members B are of the same size regardless of the length of the members.

The clamping members C may be of various specific constructions. As illustrated, these members each comprise a pair of arms 22 and 23 which are curved to fit the contour of the conduits which are to be supported. Each of the arms 22 and 23 have outwardly-extending ends 24 and 25 which have openings therein adapted to receive therethrough either a bolt or one of the extensions 18 of the conduit engaging members B. At their other ends, the arms 22 and 23 have the ears 26 and 27, and a bolt 28 extends through openings in these ears for tightening the arms about the conduit. There may be any number of these clamping members and they may be of different or the same sizes, to correspond with the size of the conduit engaging members B and the size of the conduit to be supported.

In the arrangement shown in Fig. 1, a conduit engaging member B of rather short size is carried above the top bracket A. This particular one of the members B is identified in the drawings by the character 30. Accompanying the member 30 is a particular one of the clamping means which in the drawings is identified by the character 31. The arms 22 and 23 of clamping means 31 have their ends extending adjacent the ends of the conduit engaging member 30, with the extension 18 of the member 30 extending through the opening in the arm 22 of means 31 and engaged by a washer and nut 32. The nut when turned tightly on the threaded extension serves to hold the top arm 22 of means 31 tightly in place against the member 30.

A second clamping means C which is particularly identified by the character 33 extends about a second conduit 34 below the top bracket A, and has its ends extending adjacent the ends of a second conduit engaging member B which in the drawings is particularly identified by the character 34ª. The member 34ª has its threaded extension 18 extending through the top arm 22 of the clamping means 33 and through the opening in the end of the top bracket A, through the end of arm 23 of clamping means 31 and into engagement with the tapped opening 20 in the bottom end of the conduit engaging member 30. By this engagement, the members 30 and 34ª are secured in tight end-to-end relation and one arm of each of the clamping means 31 and 33 is firmly secured between these members. Also through this same engagement, the top bracket member A is secured with the conduit engaging members.

Any number of members B may be assembled in end-to-end relation in the same manner, and the lower bracket A may be secured between any of these members or, as illustrated in Fig. 1, at the end of the lowermost of these members.

Whenever both of the arms of any clamping means C have been secured as in the manner already described, the bolt 28 of that means may be tightened to bind the arms 22 and 23 about the conduit and to bring the conduit into tight engagement with the corresponding member B. In order to secure the clamping arm to the lowermost of the members B and, as illustrated in Fig. 1, to secure the lower bracket A, a bolt 35 may be passed through the bracket and clamping arm and into threaded engagement with the tapped opening in the lowermost member B. The head of bolt 35 serves to bind the members against the shoulder 21 of this lowermost member B.

It will be observed that the conduits need not be displaced while the device is being assembled, and that the members B may be tightened against each other by the use of wrenches, and that when these members are turned in assembly they present the same surface to the cable regardless of their angular position. The structure can be built using only a few standard parts, and can be taken down and rebuilt without moving the conduits. The structure is very rigid and is enhanced in this respect by carrying a plurality of cables or pipes so that extreme strain on one is somewhat absorbed by others.

Instead of having each of the conduits on the same side of the members B, as illustrated in Fig. 1, some of the conduits may be on different sides of the members B, and in this case some of the clamping means C would extend outwardly from the axis of the members B in an opposite direction. This altered arrangement works no added strain on the device, and the construction is effected with equal facility.

In cases where the conduits to be supported are disposed at about 90° with each other, the clamping means C for these conduits may extend outwardly from the members B at about right angles with each other as is illustrated in Fig. 4. And where the conduits to be supported are disposed at still different angles, the clamping means may be turned accordingly, and the support of the conduits may be easily effected.

As illustrated in Fig. 5, the right bracket A is secured by means of the bolt 46 which engages the expanding device 40 disposed in opening 41 in top wall 42, and the left bracket A is secured by means of the bolt 47 which engages the expanding device 43 in opening 44. The assembly of the members B and the clamping means C, and the attachments of the members B and C with the brackets A are substantially the same as described in connection with the arrangement of Fig. 1. However, it may be observed that here all of the members B are within the two brackets A, and that a simple bolt 48 is employed to secure the bracket at the left end and a simple nut 49 is employed to secure the bracket at the right. The staggered arrangement of the cables, as shown in Fig. 5, provides more room between the individual cables which is an advantage for easy maintenance. This arrangement provides much more room for working on the cables and for connecting the clamping means to the pipes or conduits.

Fig. 6 represents another mounting arrangement for the improved device. By this arrangement, a supporting rod 50 has its upper end in threaded engagement with the expansible device 51 within the opening 52 in the ceiling or top wall 53. The lower end of the rod 50 is threaded and has a lock nut 55 received thereon. The nut 55 is tapped through only a part of its length and is adapted to engage the rod tightly at the upper end of the threaded portion. The lower end of rod 50 engages the tapped opening 20 of the uppermost member B. Through this engagement, the top arm of the upper clamping means C is secured tightly between nut 55 and the upper end of this upper member B. A simple nut 54 is employed at the bottom of the device and secures the lower arm of the lower clamping means C. It will be observed that with the mounting illustrated in Fig. 6, the members B are held from their top end only, and that only one bracket member is employed.

It is obvious that the improved device may be arranged and constructed in various ways differing greatly from each other, and the foregoing detailed description is given for the purpose of explanation and is not intended to describe all ways in which the invention may be practiced. Obviously, many constructions and arrangements are possible, all within the spirit of the invention.

I claim:

1. A conduit supporting device of the character set forth, comprising a conduit engaging member adapted to contact a conduit at its central portion, clamping means for securing a conduit with said member, said means including one arm extending adjacent one end of said member and another arm which extends adjacent the other end of said member, a bracket for supporting said member, means for securing said bracket and one of said arms to one end of said member, and means for securing the other arm to the other end of said member, one of said securing means being responsive to the turning of said member about its axis transverse with said conduit to tighten one of said arms against an end of said member.

2. A conduit supporting device of the character set forth, comprising a conduit engaging member adapted to contact a conduit at its central portion, said member being provided with a threaded extension at one end and a tapped opening at its other end, clamping means for securing a conduit with said member, said means including one arm engaging said threaded extension and another arm extending adjacent the other end of said member, a bracket for supporting said member, means in threaded engagement with said extension for securing said one arm to said member, and means engaging said tapped opening for securing said other arm to the other end of said member, one of said means being effective also to secure said bracket to an end of said member.

3. A conduit supporting device of the character set forth, comprising a conduit engaging member adapted to contact a conduit at its central portion, said member having a threaded extension at one end and a tapped opening at the other, conduit clamping means adapted to extend about a conduit and having one arm extending adjacent said one end, tapped means for engaging said extension to secure said arm to said member, said clamping means having another arm extending adjacent said other end, and threaded means engaging said opening in the other end of said member for securing said other arm of the clamping means to said other end of said member, said clamping means including screw means operable to tighten said arms and bind a conduit against said conduit engaging member.

4. A conduit supporting device of the character set forth, comprising a conduit engaging member adapted to contact a conduit at its central portion, said member having a threaded extension at one end and a tapped opening in the other end, a pair of clamping arms having their ends adjacent the ends of said member, a bracket, tapped means engaging the threaded extension at one end of said member for securing one of said clamping arms to said end of the member, a second conduit engaging member also having a threaded extension at one end and a tapped opening at the other end, a second pair of clamping arms having their ends adjacent the ends of said second-mentioned member, the threaded extension of said second-mentioned member being engaged within the tapped opening of said first-mentioned member to bind an arm of each of said pairs between the adjacent ends of the members, threaded means engaging the tapped opening in the end of said second-mentioned member to secure with said member a clamping arm thereto, a bracket for supporting said members and means, and means for securing said bracket adjacent an end of one of said members.

5. Apparatus as set forth in claim 4 wherein each of said members has a polygonal cross section at its end portions to facilitate the tightening of the connection between the members.

6. Apparatus as set forth in claim 4 wherein said pairs of clamping arms extend at angles of approximately 90° with each other so that the device is adapted to support conduits at approximately 90° with each other.

7. A conduit supporting device of the character set forth, comprising a plurality of conduit engaging members each adapted to contact a conduit at its central portion and each having a threaded extension at one end and a tapped opening at the other end, conduit clamping means associated with each of said members, and bracket means for supporting the members, said members being secured together through the engagement of the threaded extension of one in the tapped opening of the other, each of said clamping means having at least one arm portion secured to the members through said engagement.

8. A conduit supporting device of the character set forth, comprising a plurality of conduit engaging members each adapted to contact a conduit at its central portion and each having a threaded extension at one end and a tapped opening at the other end, conduit clamping means associated with each of said members, said members being secured together through the engagement of the threaded extension of one in the tapped opening of the other, each of said clamping means having at least one arm portion secured to the members through said engagement, a pair of bracket members each extending adjacent an end of one of said members, and means for securing said bracket members to ends of said conduit engaging members.

9. A device as set forth in claim 2 wherein said conduit engaging member has at its central portion a concave curved surface for engaging the conduit to be supported, said surface being the same for all angular positions of the member, and wherein said member at each of its end portions with a polygonal cross section to facilitate its being turned with a tool.

10. Apparatus as set forth in claim 7 wherein said bracket means contains a threaded portion which engages a tapped opening of one of said members and wherein said bracket means is equipped with a shoulder which engages an arm of one of said clamping means to secure it to said members when the threaded portion of said bracket means engages said tapped opening, and wherein the members depend one below the other and are supported in vertical arrangement by said bracket means.

11. A conduit supporting device of the character set forth, comprising a conduit engaging member having an annular depression about its central portion, said depression being adapted to form a seat for the conduit being supported, arm structure adjacent the ends of said member and extending about the conduit to be supported, threaded means responsive to the turning of said member for tightening said structure to an end of said member, and bracket means for supporting said member and arm structure, said annular depression presenting the same seat for the conduit irrespective of the angle to which said member is turned in the tightening of said structure.

JOSEPH BANNEYER.